United States Patent

[11] 3,615,335

| [72] | Inventors | Kuniaki Koshiishi<br>Tokyo-to;<br>Noboru Inoue, Funabashi-shi, both of Japan |
|---|---|---|
| [21] | Appl. No. | 845,197 |
| [22] | Filed | July 28, 1969 |
| [45] | Patented | Oct. 26, 1971 |
| [73] | Assignee | Tokyo Shibaura Denki Kabushiki Kaisha (also known as) Tokyo Shibaura Electric Co., Ltd.<br>Kawasaki-shi, Japan |
| [32] | Priority | July 31, 1968 |
| [33] | | Japan |
| [31] | | 43/54078 |

[54] BLOW HEAD LINK OF GLASS BLOW MOLDING APPARATUS
5 Claims, 7 Drawing Figs.

[52] U.S. Cl. .................................................. 65/243,
65/67, 65/261, 65/264
[51] Int. Cl. .................................................. C03b 9/00,
C03b 9/28
[50] Field of Search .......................................... 65/184,
261, 264, 243, 67

[56] References Cited
UNITED STATES PATENTS

| 2,184,900 | 12/1939 | Snyder | 65/184 X |
| 2,729,916 | 1/1956 | Casler et al. | 65/264 |

Primary Examiner—S. Leon Bashore
Assistant Examiner—Saul R. Friedman
Attorneys—Robert E. Burns and Emmanuel J. Lobato ABSTRACT: A blow head device in a ribbon machine in which cam rollers or followers for following respective cams are fixed to a sleeve having a blow shoe at its upper end and fixed to a bushing secured to a link in a manner permitting vertical movement and to a blowpipe having a blow tip at its lower end and inserted into the sleeve in a manner permitting vertical movement. The cams and cam rollers operate to cause the blow shoe to enter the region below an air tank and contact its bottom, and then the blow tip is positively inserted into a glass ribbon on an orifice plate for a blow molding operation.

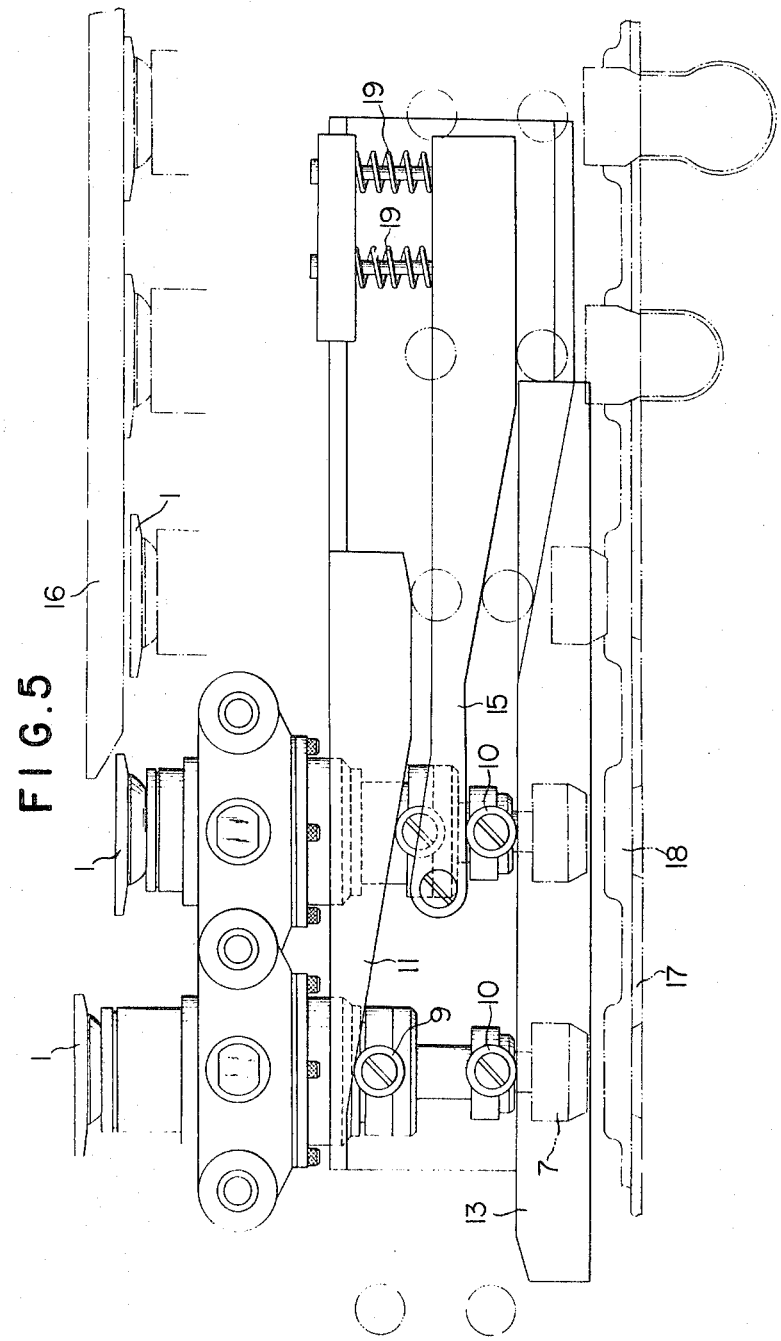

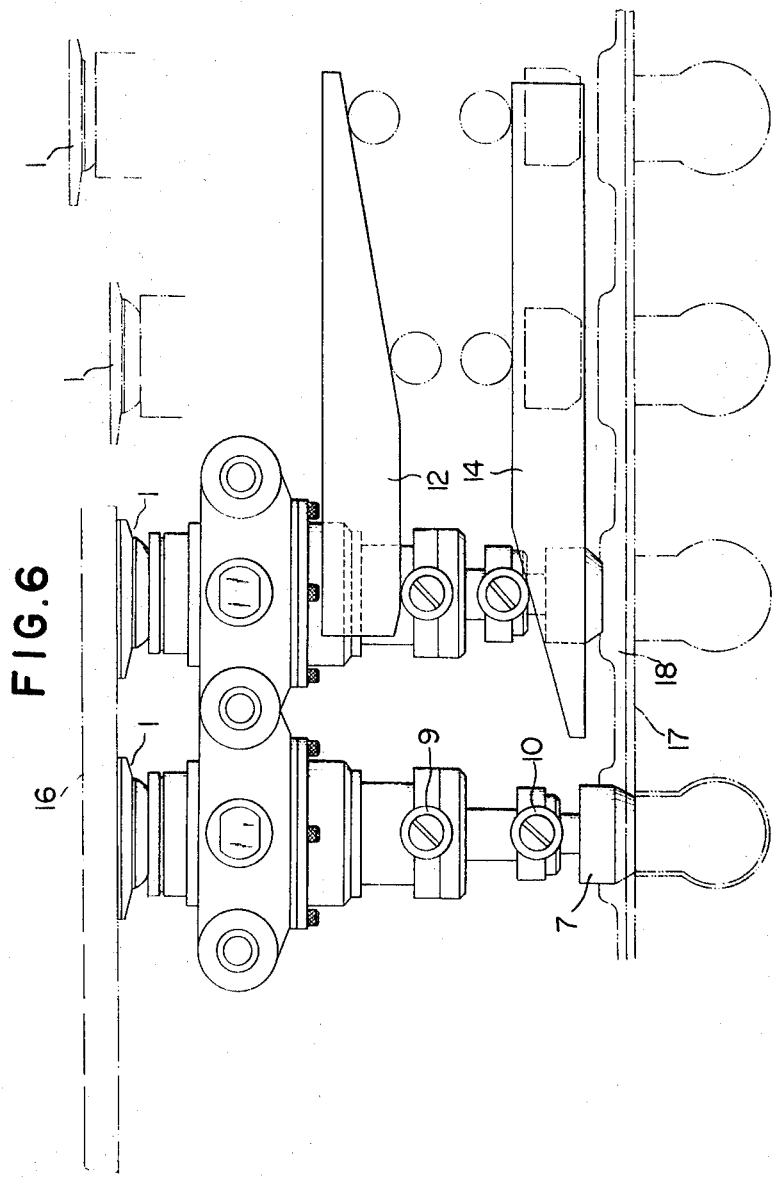

BLOW HEAD LINK OF GLASS BLOW MOLDING APPARATUS

BACKGROUND OF THE INVENTION

This invention relates to an improved blow head link of an apparatus, generally known as a ribbon machine, for automatically producing glass bulbs such as electric lamps through a blow molding operation.

In prior blow head links, the insertion of a blow tip into glass fed on an orifice plate has been effected by causing the movement of the blow shoe and the blow tip by means of a single cam in such a manner that the blow tip is aligned with a hole on the orifice plate by the pressure of a spring interposed between the blow shoe and the blow tip. In this instance the blow shoe reaches the lower surface of an air tank and, in order to insure the smooth introduction of the blow shoe under the lower surface of the air tank, the cam arrangement is such that a clearance of 2 to 3 mm. is interposed between the end surface of the blow shoe and the lower surface of the air tank liner, and then the blow shoe is elevated to contact the lower surface of the air tank by means of the spring at the terminating position of the cam.

Accordingly, the pressure to be applied to the orifice plate by the blow tip is reduced after the elevation of the blow shoe, with the resultant possibility of the generation of a gap between the blow tip and the contact surface of the glass. An air leak produced as a result thereof leads to inferior products and reduction in yield; moreover, since excessively high pressure is applied to the orifice plate at the moment of the insertion of the blow tip to the orifice plate, the service life of the orifice plate is shortened.

SUMMARY OF THE INVENTION

In view of such difficulties attendant to the conventional blow head links, the present invention has as a principal object to provide an efficient as well as useful blow head link from which the above mentioned shortcomings are eliminated, and in which cam rollers which follow different cams are respectively fixed to a sleeve having a blow shoe at an upper end and inserted into a bushing secured to the link so as to be capable of resilient movement in vertical directions, and to a blowpipe having a blow tip at a bottom end and inserted into the sleeve so as to be capable of resilient movement in vertical directions, and the blow shoe is caused to enter the region below the air tank and contact the bottom thereof by means of the cam rollers and cams. The blow tip is lowered substantially with the contact of the blow shoe with the bottom of the air tank and thereafter the blow tip is inserted into the glass on the orifice plate.

An embodiment of the present invention is described hereinbelow with respect to the attached drawings.

BRIEF DESCRIPTION OF THE DRAWINGS

FIGS. 5 and 6 are schematic side elevations of the blow head link of this invention in working conditions;

DETAILED DESCRIPTION

Figure 1:
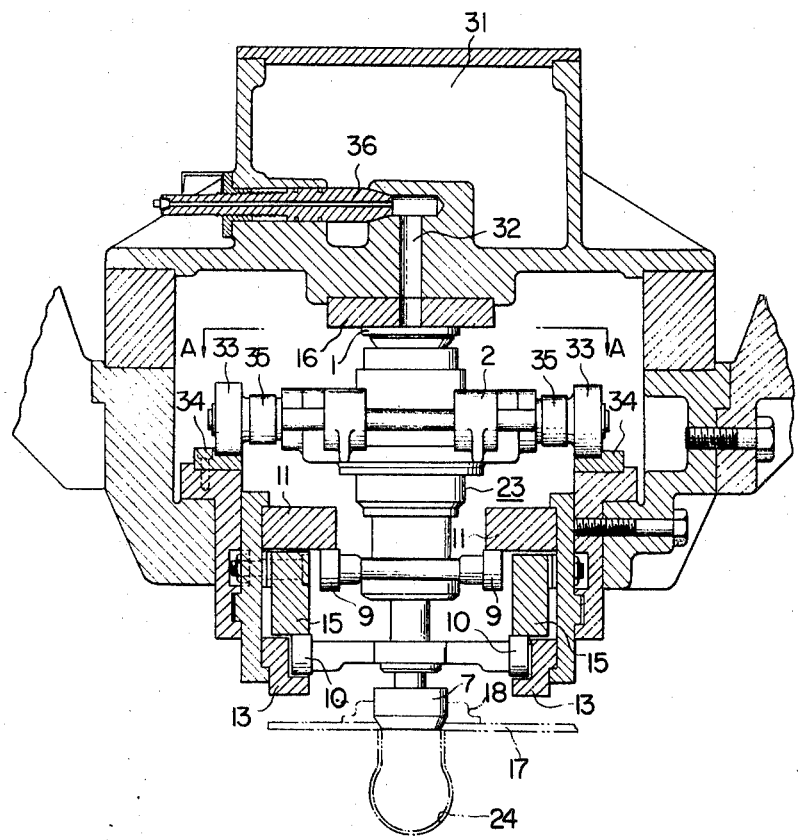
FIG. 1 is a front view of a blow head link of this invention showing a partial vertical section of the machine frame thereof.
Figure 2:
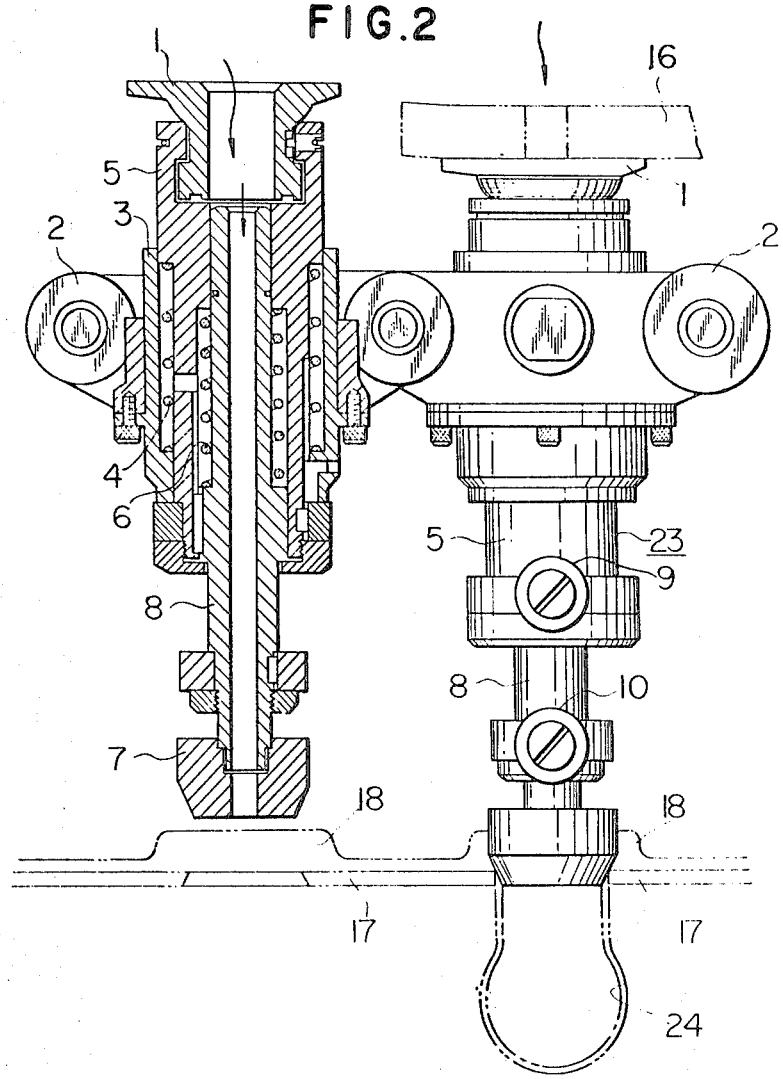
FIG. 2 is a side elevation showing two blow heads of the invention one of which is shown in longitudinal section in a position spaced apart from an orifice plate, the other being shown in side elevation in position for blow molding operation.
Figure 3:
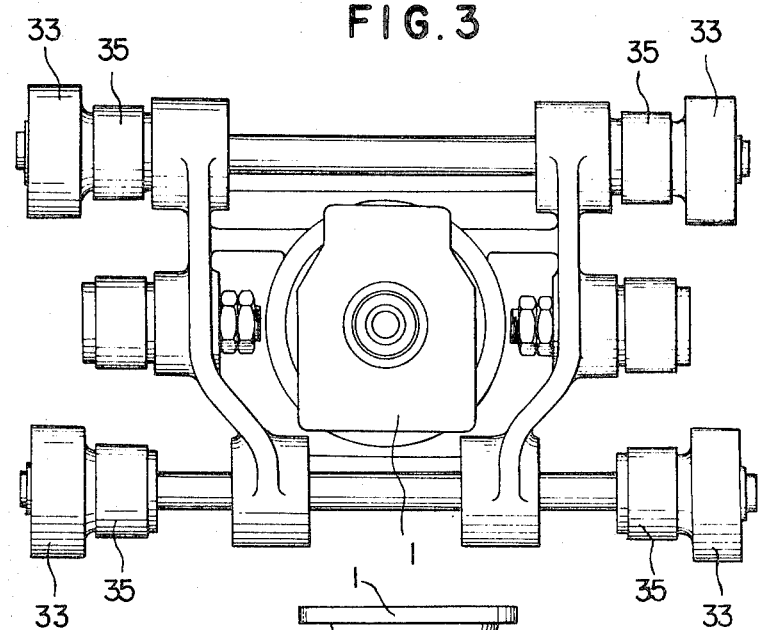
FIG. 3 is a cross section view 8; the blow head of FIG. 1 as viewed in the direction of Section line A—A of FIG. 1.
Figure 4:
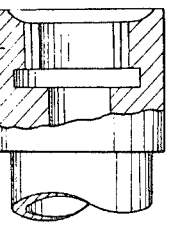
FIG. 4 is a partially cut away and disjointed side elevation of a sleeve and blow shoe.

As shown in FIGS. 1 and 2, a blow head 23 is provided with cam rollers 9 and 10. The cam rollers 9 are fixed to the side of a sleeve 5 having a blow shoe 1 at the upper end and fixed to a bushing 3 secured to chained links 2 so as to be capable of resilient movement in a vertical direction by means of a compression spring 4. A blowpipe 8 fixed with a blow tip 7 at the lower end is slidable in the sleeve 5 so as to be capable of resilient movement in a vertical direction by means of a compression spring 6. The cam rollers 10 are carried on the pipe 8. The rollers 9 and 10 follow cams 11, 12, 13, 14, and 15 as will be described hereinafter.

The cam 11 (FIG. 5) is adapted to press down the cam rollers 9 and hence the sleeve 5 in order to cause the blow shoe 1 to enter the region below the bottom of an air tank liner 16 below an air tank 31 and contact therewith, while the cam 12 (FIG. 6) is adapted to return the sleeve 5 to its initial state after the completion of a blow molding operation.

The cam 13 (see FIGS. 1 and 5) prevents the lowering of the cam rollers 10 and hence the blowpipe 8, as long as the rollers 10 are on the horizontal camming surface of the cam 13 so that the blow tip 7 cannot be lowered. However, when the blow shoe 1 enters the region below the bottom of the tank liner 16 with the roller 9 still engaging the lower surface of the cam 11, the cam 15 begins to depress the roller 10 so that the roller 10 and hence the blow tip 7 are gradually lowered toward the glass 18. When the roller 9 advances beyond the terminal edge of the cam 11 slightly after the beginning of the lowering movement of the blow tip 7, the blow shoe 1 is allowed to be slightly raised into tight contact with the air tank liner 16 while the blow tip 7 is still being lowered gradually under the action of the cam 15. At the end portion of the downwardly sloping camming surface of the cam 15, the blow tip 7 takes the lowermost position and is inserted into the glass 18 on an orifice plate 17 and at this position the blow head is supplied with air from blow molding operation through the blow shoe 1 which is now in register with air supply openings in the bottom of the air tank. The cam 13 cooperates with the cam 15 to define a path therebetween closely limiting the vertical movement of the roller 10. The cam 15 has control springs 19 (FIG. 5) which allow yielding displacement of the cam 15 when any undue external force acts thereon.

The cam 14 (FIG. 6) is adapted to separate the blow tip 7 away from the glass 18 and back to its initial state after the completion of blow molding operation.

Figure 7:
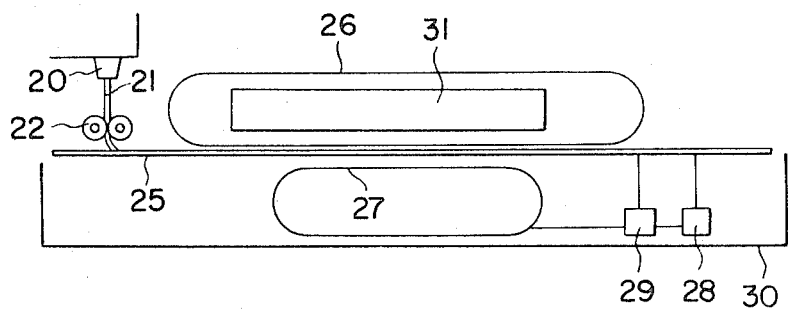
FIG. 7 is a schematic drawing showing an apparatus for blow molding glass bulbs which is provided with the blow head of this invention.

FIG. 7 is a schematic view of a conventional ribbon machine to which the blow heads of this invention are employed. In this figure, the reference numeral 20 designates an orifice of a glass fusing furnace, and 21 represents fused glass which has flowed out of the orifice 20 to be formed into the shape of a ribbon by means of a pair of feed rollers 22 and fed onto orifice plates 17 forming endless orifice plate links 25 running in a horizontal plane. The glass is then suspended from the orifice plates through openings perforated therein and molded into the shape of glass bulbs as is known in the art by low pressure air blown through the blow heads 23 carried on blow head links 26 running on an elongated insular orbit in a vertical plane above the orifice plates 17 and in synchronism therewith and by molds 24 carried on endless mold links 27 running on an elongated insular orbit in a vertical plane below the orifice plate 17 and in synchronism therewith. The numeral 28 and 29 denote driving members, 30 denotes a frame, and 32 an air passage formed in the air tank 31 and the liner 16. In FIG. 1, 33 are guide rollers mounted on the link 2, 34 guide rails, and 35 drive rollers. 36 is a valve controlling the supply of the air.

In the present invention, composed as described hereinabove, the glass discharged out of the orifice 20 and supplied onto the orifice plates 17 through the feed rollers 22 is further advanced by the running of the orifice plates and then blow molded into the shape corresponding to that of the mold 24 by the insertion of the blow tip 7 which is lowered synchronously into the glass 18 and the blow air from the opening of the air tank 31. In this instance, while the blow tip 7 is not yet in contact with the glass 18 and is advancing in its upper position, the blow shoe 1 to be slidably contacted with the liner 16 of the air tank 31 is lowered gradually by means of the cam unit 11. The blow shoe 1 enters the region below the liner 16 and moves past the terminus of the cam 11, when it is elevated due to the force of the spring 4 to which it is continually subjected, to contact slidingly the bottom of the liner 16.

Immediately after the blow shoe 1 thus comes into contact with the liner 16, the blow tip 7 is lowered by the terminus of the cam 13 due to the resilient force of the spring 6 being assisted by the cam 15, to insert its tip into the glass 18.

When the openings of the blow shoe 1 are brought into register with the opening of the air tank 31 and liner 16 by further advance after the blow tip 7 is inserted into the glass 18, low-pressure air is blown into the glass 18 to blow mold a glass bulb corresponding in shape to the mold 24.

Thus, in the blow head link according to this invention, the blow shoe and blow tip are moved independently by separate springs and by different cams, and the blow tip is inserted into the glass positively only after the blow shoe is closely contacting the air tank liner, thereby eliminating the generation of leaks due to insufficiency in contact pressure and deviations and irregularities in the depth of contact between the blow tip and glass surface which are apt to occur at the moment of the intrusion of the blow shoe to the bottom of the air tank. The insufficient blowing-in of air due to such causes is therefore completely avoided, so that inferior or defective products cannot possibly be produced.

We claim:

1. A glass machine blow head mechanism for blow molding glass supported on an underlying orifice plate chain comprising plural blow head links pivotally connected together in chainlike fashion, means advancing the links in a path coextensive with a portion of the travel of said underlying orifice plate chain, a stationery blow box spaced above the orifice chain and along a portion of its path, each of the blow head links including a sleeve having a blow shoe at the upper end axially displaceable, a bushing defined by the link mounting said sleeve, the blow shoe being engageable with the blow box, a blow pipe slidable axially in said sleeve and having a blow tip at a bottom end for engaging glass on the orifice plate thereby enabling independent reciprocable axial movements of the blow tip and the blow shoe a first cam follower on said sleeve spaced below said link opposite the blow shoe, a second cam follower on said blowpipe spaced below the first cam follower, a first cam in the path of the first cam follower for sequentially lowering and then raising the blow shoe relative to said blow box in seating the blow shoe in operative engagement with the blow box, a second cam below the second cam follower and overlapping the terminal reaches of said first cam, engageable with said second cam follower for sequentially holding the blow tip spaced from the glass and moving the blow tip downwardly into the glass after the blow shoe has been moved into tight engagement with the blow box, a third cam mounted above the second cam and overlapping its span, the second and third cam defining a path closely limiting the vertical movement of the second cam follower in moving the blow tip into the glass, thereby controlling the seating of the blow tip in moving it into the glass.

2. A glass machine blow head mechanism according to claim 1, including resilient control means connected to the third cam, thereby allowing yielding displacement thereof when any undue external force acts thereon.

3. A glass machine blow head mechanism according to claim 1, wherein spring means is interposed between a shoulder on the inner wall of said bushing and a shoulder on the outer surface of said sleeve to resiliently urge the sleeve upwardly relative to the bushing, and wherein another spring means is interposed between a shoulder on the inner surface of said sleeve and a shoulder on the outer surface of said blow pipe to resiliently urge the blow pipe downwardly relative to said sleeve.

4. A glass machine blow head mechanism for blow molding glass supported on an underlying orifice plate chain comprising, plural blow head links pivotally connected together in chainlike fashion, means advancing the links in a path coextensive with a portion of the travel of said underlying orifice plate chain, a stationary blow box spaced above the orifice chain and along a portion of its path, each of the blow head links including a sleeve having a blow shoe at the upper end axially displaceable, a bushing defined by the link mounting said sleeve, the blow shoe being engageable with the blow box, a blowpipe having a blow tip at the bottom end for engaging glass on the orifice plate, the blowpipe being slidable axially in said sleeve thereby enabling independent reciprocable axial movements of the blow tip and the blow shoe, a first cam follower on said sleeve spaced below said link opposite the blow shoe, a second cam follower on said blowpipe spaced below the first cam follower, a longitudinally extending first cam in the path of the first cam follower for sequentially lowering and then gradually raising the blow shoe relative to said blow box in seating the blow shoe in operative engagement with the blow box, a longitudinally extending second cam below the second cam follower and overlapping the terminal reaches of said first cam, said second cam being engageable with said second cam follower for sequentially holding the blow tip spaced from the glass and then starting gradual downward movement of the blow tip toward the glass slightly before the blow shoe is raised toward the blow box, a third cam mounted above the second cam and overlapping its span, the second and third cams defining a path closely limiting the vertical movement of the second cam follower in moving the blow tip into the glass, thereby controlling the seating of the blow tip in moving it into the glass.

5. A glass machine blow head mechanism according to claim 4, including resilient support means connected to the third cam which allows yielding displacement of the cam when any undue external forces act thereon.